(12) United States Patent
Gullentops

(10) Patent No.: US 9,199,272 B2
(45) Date of Patent: Dec. 1, 2015

(54) SYSTEM AND METHOD FOR DIGITAL CREATION OF A PRINT MASTER USING A MULTIPLE PRINTHEAD UNIT

(75) Inventor: Chris Gullentops, Kessel-Lo (BE)

(73) Assignee: AGFA GRAPHICS NV, Mortsel (BE)

( * ) Notice: Subject to any disclaimer, the term of this patent is extended or adjusted under 35 U.S.C. 154(b) by 537 days.

(21) Appl. No.: 13/581,691

(22) PCT Filed: Mar. 21, 2011

(86) PCT No.: PCT/EP2011/054177
§ 371 (c)(1),
(2), (4) Date: Aug. 29, 2012

(87) PCT Pub. No.: WO2011/120831
PCT Pub. Date: Oct. 6, 2011

(65) Prior Publication Data
US 2012/0321795 A1  Dec. 20, 2012

Related U.S. Application Data

(60) Provisional application No. 61/318,812, filed on Mar. 30, 2010.

(30) Foreign Application Priority Data

Mar. 30, 2010  (EP) ..................................... 10158421

(51) Int. Cl.
| | | |
|---|---|---|
| B05D 5/00 | (2006.01) | |
| B05D 5/02 | (2006.01) | |
| B29C 59/16 | (2006.01) | |
| B41C 1/00 | (2006.01) | |
| B41C 1/18 | (2006.01) | |
| B41J 19/16 | (2006.01) | |
| B41C 1/05 | (2006.01) | |

(52) U.S. Cl.
CPC .. *B05D 5/00* (2013.01); *B05D 5/02* (2013.01); *B29C 59/16* (2013.01); *B41C 1/003* (2013.01); *B41C 1/18* (2013.01); *B41J 19/16* (2013.01); *B41C 1/05* (2013.01)

(58) Field of Classification Search
None
See application file for complete search history.

(56) References Cited

U.S. PATENT DOCUMENTS

| | | |
|---|---|---|
| 4,992,890 A | 2/1991 | Pinard et al. |
| 6,193,923 B1 | 2/2001 | Leyden et al. |
| 2003/0189617 A1 | 10/2003 | Mott et al. |
| 2004/0131778 A1* | 7/2004 | Verhoest et al. ............... 427/258 |
| 2004/0252174 A1 | 12/2004 | Baxter et al. |
| 2005/0046051 A1* | 3/2005 | Sastry ......................... 261/114.1 |
| 2005/0046651 A1 | 3/2005 | Askren et al. |
| 2009/0197013 A1 | 8/2009 | Gouch et al. |
| 2010/0072181 A1 | 3/2010 | Maschera et al. |

FOREIGN PATENT DOCUMENTS

| | | |
|---|---|---|
| EP | 1 428 666 A1 | 6/2004 |
| EP | 2 199 065 A1 | 6/2010 |
| EP | 2 199 066 A1 | 6/2010 |
| WO | 2012/022636 A1 | 2/2012 |
| WO | 2012/022650 A1 | 2/2012 |
| WO | 2012/080058 A1 | 6/2012 |

OTHER PUBLICATIONS

Official Communication issued in International Patent Application No. PCT/EP2011/054177, mailed on Jun. 7, 2011.
Gullentops, "System and Method for Digital Creation of a Print Master Using a Multiple Printhead Unit", U.S. Appl. No. 13/816,384, filed Feb. 11, 2013.
Gullentops, "Digital System for Creating a Flexographic Printmaster", U.S. Appl. No. 13/816,379, filed Feb. 11, 2013.
Gullentops, "System and Method for the Digital Creation of a Print Master by Means of a Liquid Droplet Deposition Apparatus", U.S. Appl. No. 13/883,622, filed May 6, 2013.

* cited by examiner

*Primary Examiner* — William Phillip Fletcher, III
(74) *Attorney, Agent, or Firm* — Keating and Bennett, LLP

(57) ABSTRACT

A relief print master is created with a printhead that jets droplets of a polymerizable liquid on a cylindrical sleeve. The droplets follow a spiral path on the cylindrical sleeve. In a multiple printhead unit, there are different spiral paths associated with the constituting printheads in the multiple printhead unit. The distance between the spiral paths is not even. Preferred embodiments of the current invention provide a method and a system so that the distance between these spiral paths becomes even. The system can also be used for the creation of other types of print masters, such as offset print plates.

20 Claims, 10 Drawing Sheets

SYSTEM AND METHOD FOR DIGITAL CREATION OF A PRINT MASTER USING A MULTIPLE PRINTHEAD UNIT

CROSS-REFERENCE TO RELATED APPLICATIONS

This application is a 371 National Stage Application of PCT/EP2011/054177, filed Mar. 21, 2011. This application claims the benefit of U.S. Provisional Application No. 61/318,812, filed Mar. 30, 2010, which is incorporated by reference herein in its entirety. In addition, this application claims the benefit of European Application No. 10158421.7, filed Mar. 30, 2010, which is also incorporated by reference herein in its entirety.

BACKGROUND OF THE INVENTION

1. Field of the Invention

The invention deals with the field of creating print masters, and more specifically with digital methods and systems for creating a flexographic print master on a drum with a fluid depositing printhead.

2. Description of the Related Art

The invention reduces a problem that may result when a printhead unit is used that uses more than one nozzle row.

In flexographic printing or flexography a flexible cylindrical relief print master is used for transferring a fast drying ink from an anilox roller to a printable substrate. The print master can be a flexible plate that is mounted on a cylinder, or it can be a cylindrical sleeve.

The raised portions of the relief print master define the image features that are to be printed.

Because the flexographic print master has elastic properties, the process is particularly suitable for printing on a wide range of printable substrates including for example, corrugated fiberboard, plastic films, or even metal sheets.

A traditional method for creating a print master uses a light sensitive polymerizable sheet that is exposed by a UV radiation source through a negative film or a negative mask layer ("LAMS"-system) that defines the image features. Under the influence of the UV radiation, the sheet will polymerize underneath the transparent portions of the film. The remaining portions are removed, and what remains is a positive relief print plate.

In the published applications EP-A1-2199066 and EP-A1-2199065, both assigned to Agfa Graphics NV and having a priority date of 2008-12-19, a digital solution is presented for creating a relief print master using a fluid droplet depositing printhead.

The published application EP-A1-2199065 teaches that a relief print master can be digitally represented by a stack of two-dimensional layers and discloses a method for calculating these two-dimensional layers.

The published application EP-A1-2199066 teaches a method for spatially diffusing nozzle related artifacts in the three dimensions of the stack of two-dimensional layers.

Both published applications also teach a composition of a fluid that can be used for printing a relief print master, and a method and apparatus for printing such a relief print master.

FIG. 1 shows a preferred embodiment of such an apparatus 100. 140 is a rotating drum that is driven by a motor 110. A printhead 150 moves in a slow scan direction Y parallel with the axis of the drum at a linear velocity that is coupled to the rotational speed X of the drum. The printhead jets droplets of a polymerizable fluid onto a removable sleeve 130 that is mounted on the drum 140. These droplets are gradually cured by a curing source 160 that moves along with the printhead and provides local curing. When the relief print master 130 has been printed, the curing source 170 provides an optional and final curing step that determines the final physical characteristics of the relief print master 120.

An example of a printhead is shown in FIG. 3. The printhead 300 has nozzles 310 that are arranged on a single axis 320 and that have a periodic nozzle pitch 330.

FIG. 2 demonstrates that, as the printhead moves from left to right in the direction Y, droplets 250 are jetted onto the sleeve 240, whereby the "leading" part 211 of the printhead 210 prints droplets that belong to a lower layer 220, whereas the "trailing" part 212 of the printhead 210 prints droplets of an upper layer 230.

Because in the apparatus in FIGS. 1 and 2 the linear velocity of the printhead in the direction Y is directly coupled with the rotational speed X of the cylindrical sleeve 130, 240, each nozzle of the printhead jets fluid along a spiral path on the rotating drum. This is illustrated in FIG. 5, where it is shown that fluid droplets ejected by nozzle 1 describe a spiral path 520 that has a pitch 510.

In FIG. 5, the pitch 510 of the spiral path 520 was selected to be exactly double the length of the nozzle pitch 530 of the printhead 540. The effect of this is that all the droplets of nozzles 1, 3, 5 having an odd index number fall on the first spiral path 520, whereas the droplets ejected by nozzles 2, 4, 6 having an even index number fall on the second spiral path 550. Both spiral paths 520 550 are interlaced and spaced at an even distance 560 that corresponds with the nozzle pitch 530.

The lowest value of the nozzle pitch 330 in FIG. 3 is constrained by technical limitations in the production of a printhead. One solution to overcome this constraint is to use a multiple printhead unit.

The concept of a multiple printhead unit is explained by means of FIG. 4. As the figure shows, two printheads 401 and 402 are mounted back to back to form a multiple printhead unit 400. By staggering the position of the nozzles 410 on the axis 420 of head 401 and the nozzles 411 on axis 421 of printhead 402 over a distance of half a nozzle pitch, the effective nozzle pitch 431 of the back to back head is half the nozzle pitch of each printhead 401, 402 and the effective printing resolution is doubled.

The use of a multiple printhead unit in an apparatus as shown in FIG. 1 or FIG. 2 for the purpose of printing a relief print master introduces an unexpected and undesirable side effect.

FIG. 6. shows a first spiral path 610 on which fluid droplets from the nozzles having an odd index number 1, 3 and 5 land and a second spiral path 611 on which the fluid droplets of the nozzles having an even index number 2, 4 and 6 land.

The nozzles with an odd index number are located on a first axis 620 and the nozzles having an even index number are located on a second axis 621, parallel with the first axis 620.

Because these two axes 620 and 621 of the nozzle rows in the multiple printhead unit are not congruent, the spiral paths 610 and 611 are not evenly spaced with regard to each other. For example, in FIG. 6 the distance 640 is different from the distance 641.

The uneven spacing of the spiral paths 610 and 611 causes an uneven distribution of the fluid droplets along the Y direction when they are jetted onto the sleeve and this negatively affects the quality of the print master that is printed.

SUMMARY OF THE INVENTION

In view of the problems described above, preferred embodiments of the current invention to improve the evenness of the distribution of fluid droplets that are jetted onto a drum to create a relief print master using a back to back printhead unit or—more in general—a printhead unit that comprises multiple printheads.

The preferred embodiments of the current invention are realized by a system and a method as described below.

By slightly shifting the nozzle rows in a multiple printhead unit with regard to each other, the distance between the interlaced spiral paths can be adjusted so that they become evenly spaced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 6:
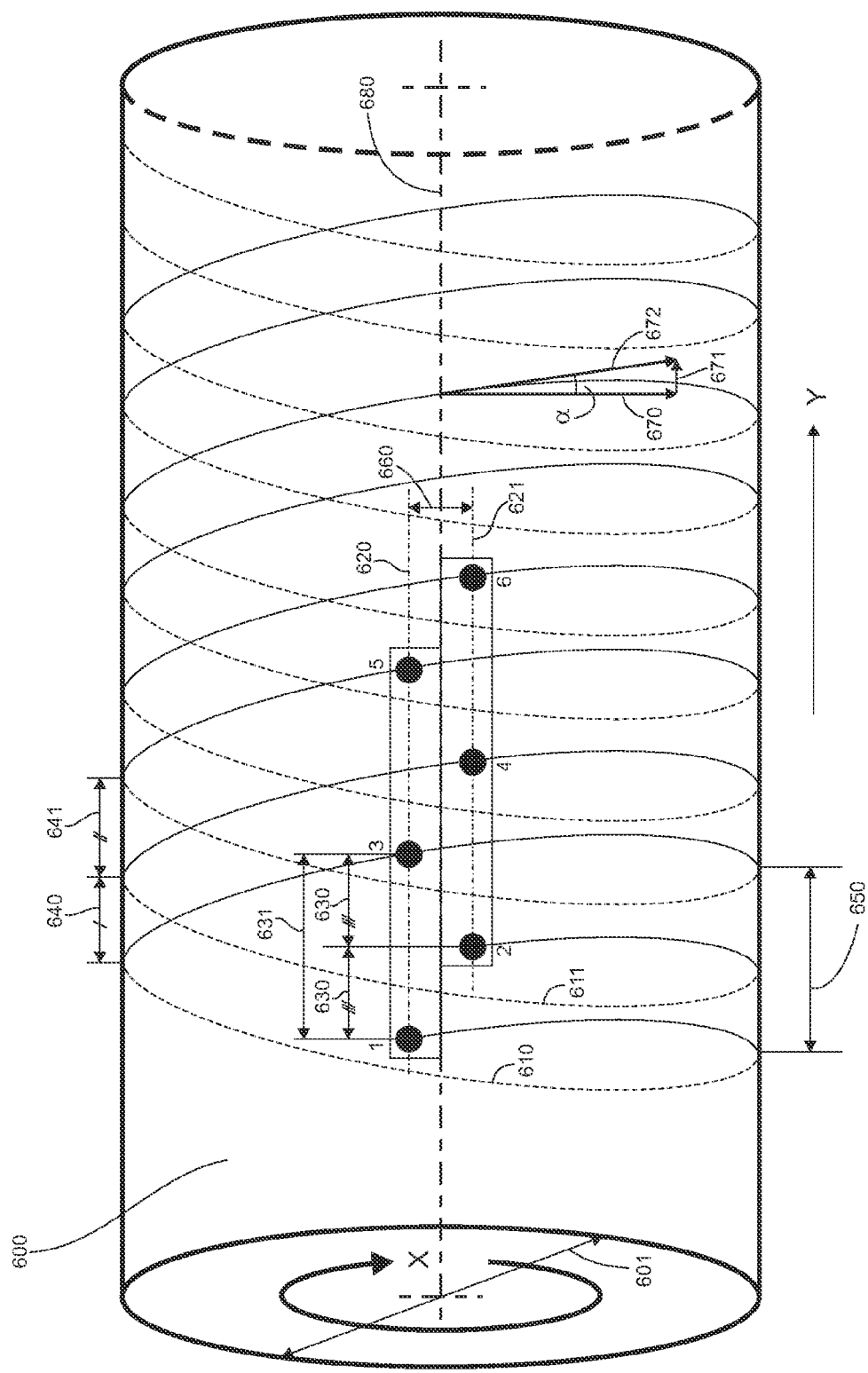
FIG. 6 shows two spiral paths on which the fluid droplets land that are ejected by the nozzles of a printhead as in FIG. 4.

Referring to FIG. 6, 600 is a rotating sleeve or support that has a diameter 601 represented by the variable SleeveDiameter.

The circumference of the sleeve is represented by the variable SleeveCircumference and has a value equal to:

$$SleeveCircumference = PI * SleeveDiameter$$

The sleeve rotates in a X direction at a frequency that is represented by the variable NumberofRevolutionsperSecond. The time of one revolution is represented by the variable RevolutionPeriod. It is equal to:

$$RevolutionPeriod = 1/NumberofRevolutionsperSecond.$$

The circumferential speed of the sleeve has a value CircumferentialSpeed. It is equal to:

$$CircumferentialSpeed = SleeveCircumference * Numberof\\RevolutionsperSecond$$

The direction and magnitude of the circumferential speed defines a first speed vector 670 that is tangential to the cylindrical sleeve and perpendicular to its axis.

The distance between two neighboring nozzles in a single printhead is the nozzle pitch 631 and is represented by a variable P.

In the multiple printhead unit as shown in FIG. 6, two printheads are positioned in such a way that the nozzles in the printheads are interlaced. In a prior art technique, the nozzles on a second row 621 of nozzles in a second printhead are shifted over a distance P/2 (630 in FIG. 6) with regard to the nozzles on a first row 620 of nozzles in a first printhead. The resulting two printhead unit has a nozzle pitch 630 that is half the nozzle pitch 631 of the constituting printheads. This means that the resulting multiple printhead unit has an intrinsic resolution that is double of the resolution of the constituting printheads.

The movement of the printhead is linked to the rotation of the sleeve by a mechanical coupling (for example by a worm and gear) or by an electronic gear (electronically coupled servomotors). During a single revolution of the sleeve, the printhead moves over a distance 650 that is represented by a variable PrintheadPitch. The value of this distance should be an integer multiple, represented by a variable IntegerMultiplier of the distance between two neighboring nozzles:

$$PrintheadPitch = IntegerMultiplier * P/2$$

The speed at which the printhead moves in the Y direction is represented by the variable PrintheadSpeed. Its value is equal to:

$$PrintheadSpeed = PrintheadPitch/RevolutionPeriod$$

The speed and magnitude of the printhead defines a second speed vector 671.

The sum of the two speed vectors 670 and 671 corresponds with the speed vector 672. This speed vector is tangential to the spiral path on which liquid droplets are jetted. The angle α between the speed vector 672 and the first speed vector 670 is expressed by:

$$\tan(\alpha) = PrintheadSpeed/CircumferentialSpeed$$

$$\alpha = a\tan(PrintheadSpeed/CircumferentialSpeed)$$

The distance 660 between two nozzle rows 620 and 621 in FIG. 6 is represented by the variable D.

Figure 5:
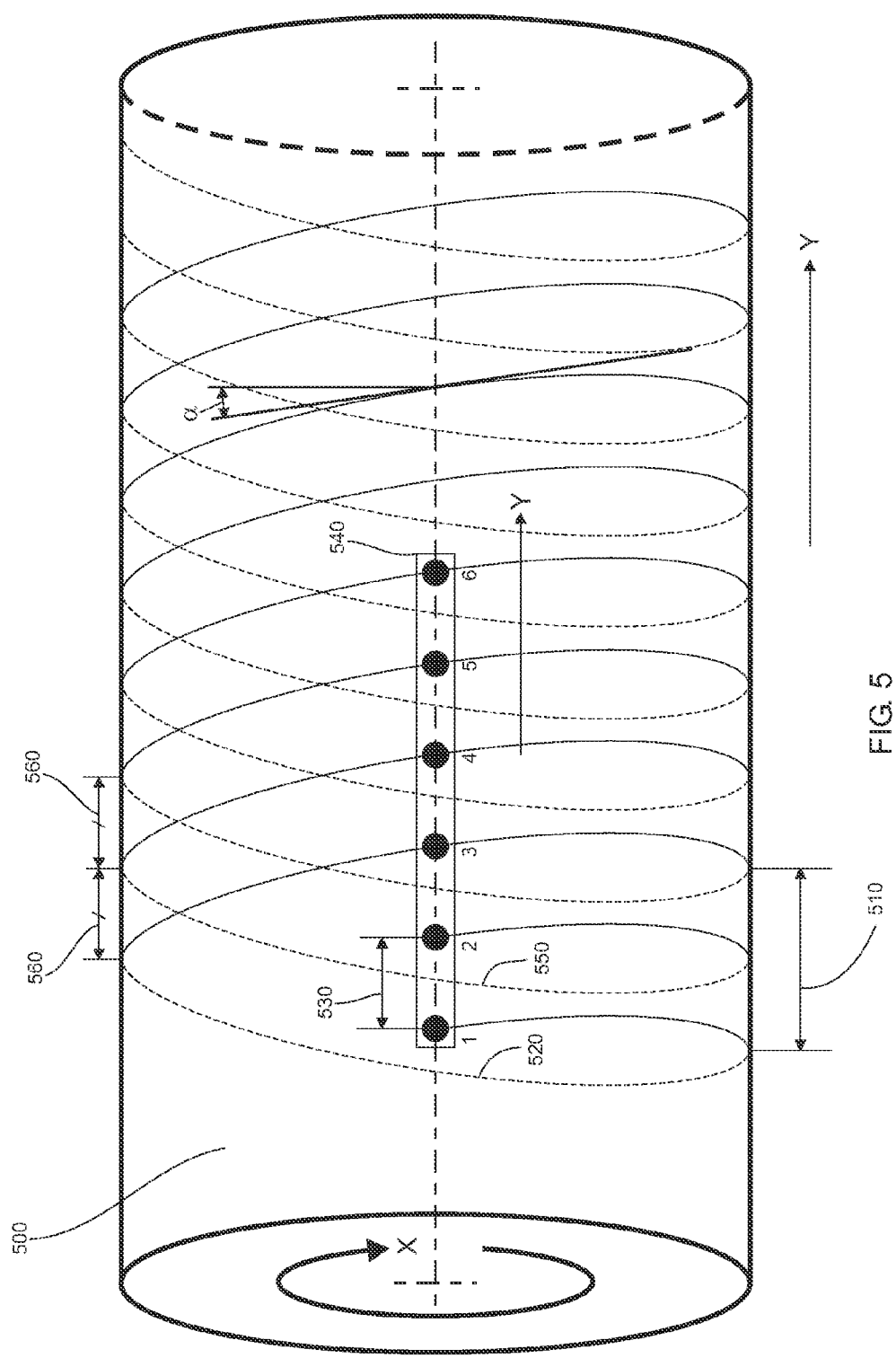
FIG. 5 shows two spiral paths on which the fluid droplets ejected by the nozzles of a printhead as in FIG. 3 land.

Unlike in FIG. 5, the two spiral paths 610, 611 in FIG. 6 are not evenly spaced along the Y direction. More specifically, the distance 640 in FIG. 6 is shorter than the distance 641. This is a result of the distance 660 between the two nozzle rows 620, 621.

Figure 7:
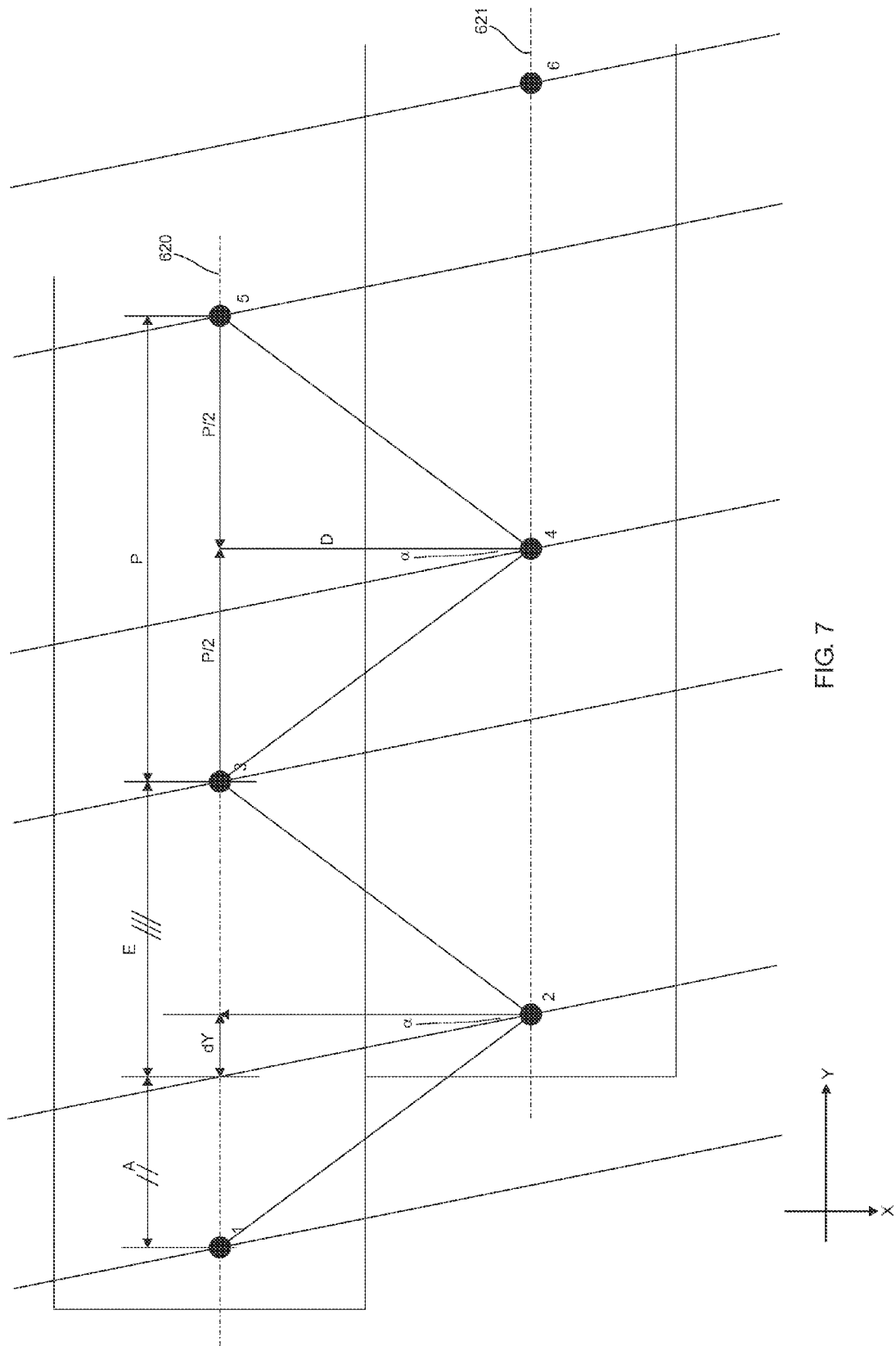
FIG. 7 describes in detail the geometrical interactions between the movements of the printhead and the cylindrical sleeve, and the distance between the spiral paths when the axis of the printhead is parallel with the axis of the cylindrical sleeve.

FIG. 7 shows a detail of FIG. 6 that is used for geometrically describing the difference between the distance 640 and the distance 641 in FIG. 6.

It is assumed that the length of the distance D is negligible with regard to the length of the Circumference. In that case the cylindrical surface of the sleeve can be approximated by a plane so that conventional (two-dimensional) trigonometry can be used to describe the geometrical relationships between the different variables.

In FIG. 7:
- the distance P corresponds with the nozzle pitch 631 in FIG. 6;
- the distance D corresponds with the distance 660 between two nozzle rows in FIG. 6;
- the distance A corresponds with the distance 640 between two spiral paths in FIG. 6;
- the distance E corresponds with the distance 641 between two spiral paths in FIG. 6.

The distance dY corresponds with the amount that the distance A is shorter than the distance P/2 (half the nozzle pitch), and the amount that the distance E is longer than the distance P/2. This is mathematically expressed as follows:

$$A = P/2 - dY$$

$$E = P/2 + dY$$

$$A + E = 2*P/2$$

The value of dY can be directly expressed as a function of the angle α and the nozzle row distance D:

$$\tan(\alpha) = dY/D$$

$$dY = D*\tan(\alpha)$$

And hence:

$$A = P/2 - D*\tan(\alpha)$$

The above expression teaches that:

$$A = P/2$$

when at least one of the following two conditions is met:
1. D=0 (this is the situation that is shown in FIG. 5)
2. α=0 (this situation is only approximated when the PrintheadPitch is very small with respect to the CircumferentialSpeed, which is the case in many practical situations)

The above expression also teaches that dY becomes larger when the distance D between the nozzle rows increases or when the ratio ($\tan(\alpha)$) of the PrintheadSpeed over the CircumferentialSpeed increases.

Figure 8:
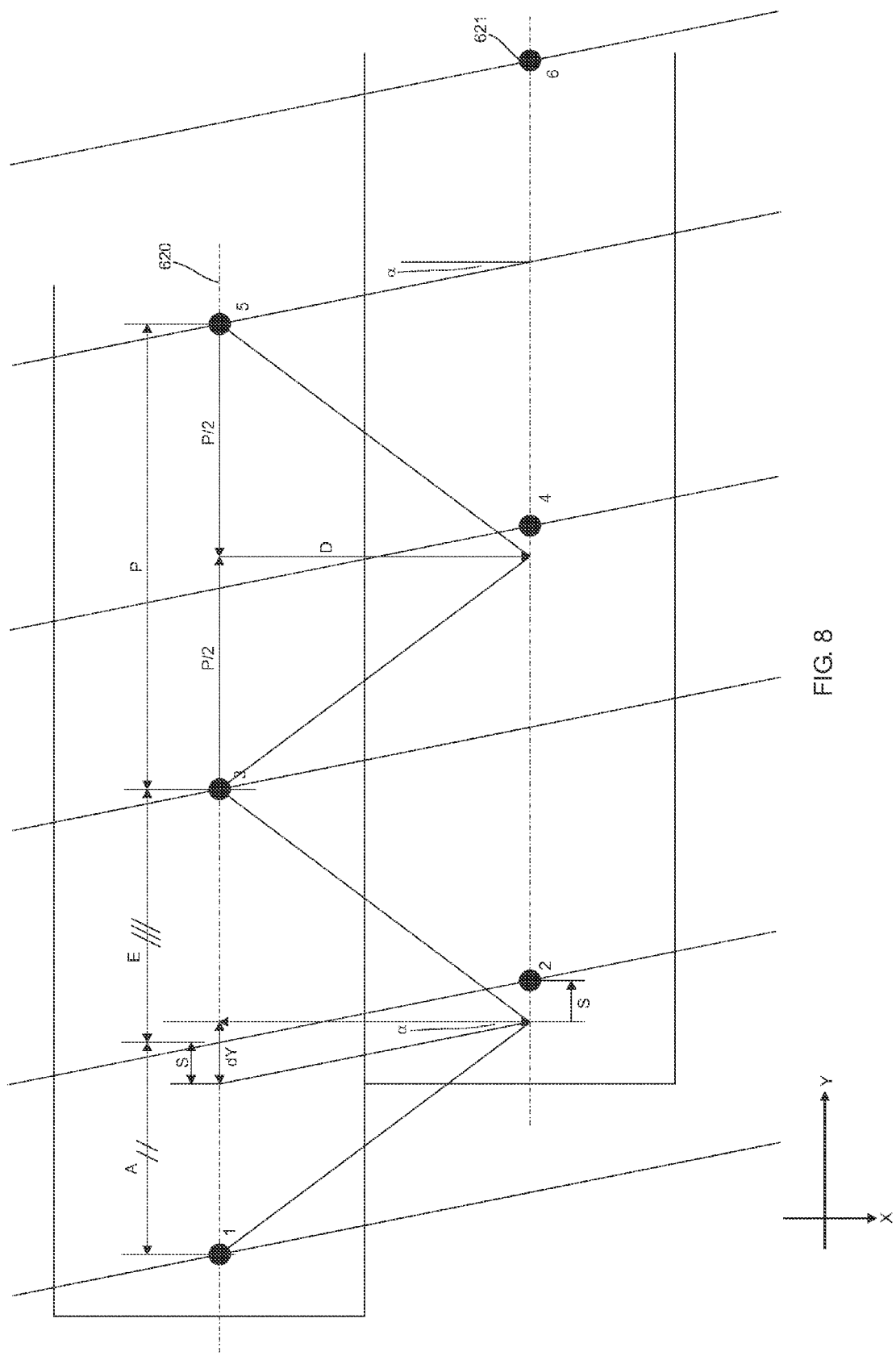
FIG. 8 describes in detail the geometrical interactions between the movements of the printhead and the cylindrical sleeve, and the distance between the spiral paths when the nozzle rows of the printhead are shifted with regard to each other.

We will now describe by means of FIG. 8 that it is possible to reduce dY, or even to make equal to zero and hence to make:

$$A = E = P/2$$

without setting α=0 or setting D=0, but instead by shifting one of the nozzle rows in the multiple printhead unit with regard to the other nozzle row over a specific distance S.

In FIG. 8, the value of A is expressed as:

$$A = P/2 - dY + S$$

$$A = P/2 - D*\tan(\alpha) + S$$

If the following value for S is selected:

$$S = D*\tan(\alpha)$$

then it is obtained that:

$$A = E = P/2$$

In other words, by shifting one of the rows of nozzles over a distance S that is equal to $D*\tan(\alpha)$, it is obtained that these interlaced paths are equidistant at a distance equal to P/2.

Figure 9:
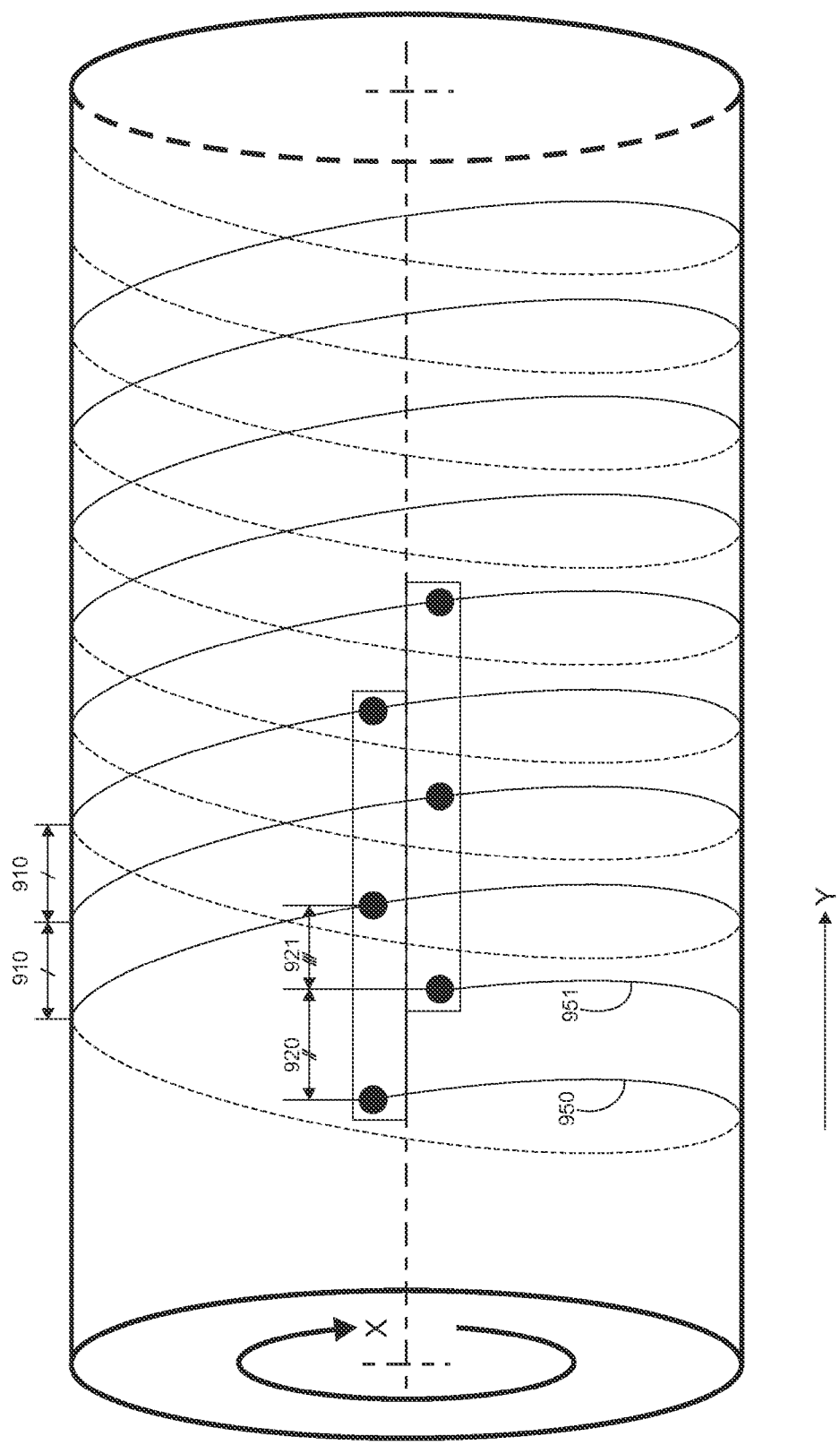
FIG. 9 shows a preferred embodiment according to the current invention in which the nozzle rows are shifted with regard to each other.

FIG. 9 gives a further illustration of a preferred embodiment of the invention. By shifting the two rows of nozzles with regard to each other, it is possible to equalize the distance 910 between the spiral paths 950 and 951 and to make them equal to the P/2.

The above description provides an exemplary preferred embodiment of the current invention on which a number of variations exist.

In the first place it is not always required that the shifting S of a nozzle row is exactly equal to $D*\tan(\alpha)$. It was already demonstrated by means of FIG. 7 that if the distance D between the nozzle rows is small compared to the circumference of the cylindrical sleeve, that the deviation dY is small compared to the distance P of the nozzle pitch. In that case a shift S of the row of nozzles by an amount that is less than $D*\tan(\alpha)$ provides already a sufficient improvement of the evenness of the distances A and E between the spiral paths. In general, a shift of $r*D*\tan(\alpha)$ in which r is a parameter that has a value of approximately one will already improve the evenness of the distances A and E.

Preferably:

$$S = r*D*\tan(\alpha)$$

in which:

$$0.1 \leq r \leq 1.9$$

Even more preferably:

$$0.5 \leq r \leq 1.05$$

Even more preferably:

$$0.9 \leq r \leq 1.1$$

And most preferably:

$$0.99 \leq r \leq 1.01$$

In the second place, preferred embodiments of the invention are not limited to a combined head that uses only two rows of nozzles. The number of rows of nozzles can, in principle, be any integer number N (such as 2, 3, 4 or more).

Figure 10:
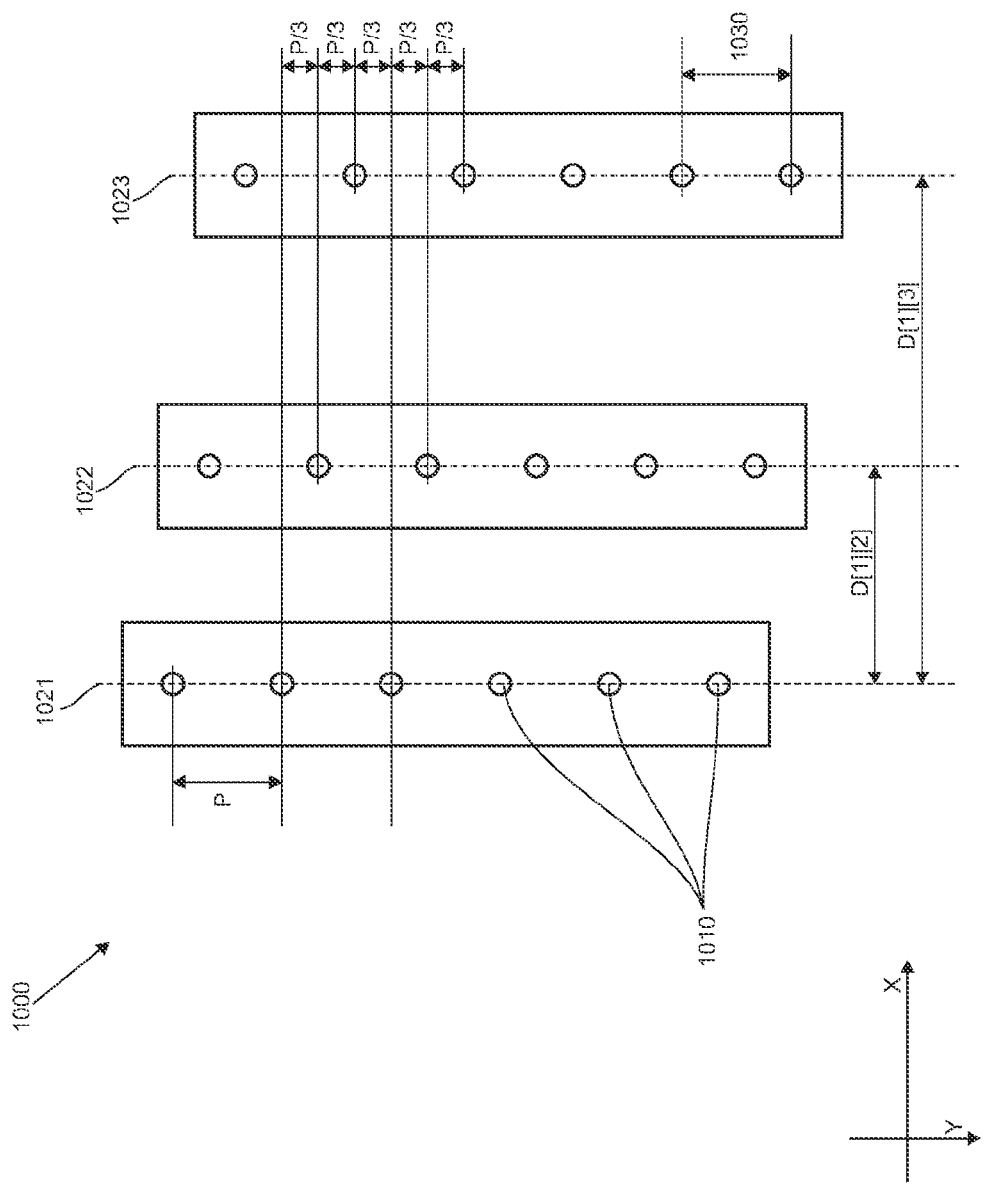
FIG. 10 shows a printhead unit that comprises not two but three printheads.

An example of a system that uses three rows of nozzles is shown in FIG. 10. A first printhead has a first row of nozzles 1021, a second printhead has a second row of nozzles 1022 and a third printhead has a third row of nozzles 1023.

A more general preferred embodiment of a printhead unit has N nozzle rows having index numbers 1, 2, 3, 4 . . . N. The index numbers of the nozzle rows do not necessarily correspond with the order that the nozzle rows are physically mounted.

The distance in the X dimension between the first nozzle row 1021 and the second nozzle row 1022 has a value D[1][2], whereas the distance in the X dimension between the first nozzle row 1021 and the third nozzle row 1023 is D[1][3].

In a more general preferred embodiment the distance between a first nozzle row having an index number i and a second nozzle row having an index number j is equal to D[i][j] and can be obtained by subtracting the value of an X coordinate of the first nozzle row with index number i from the value of an X coordinate of the second nozzle row having index number j.

Each individual printhead in FIG. 10 has a pitch P. In a prior art system, the second row of nozzles 1022 is shifted over a distance P/3 in the Y dimension with regard to the first nozzle row 1021 and the third nozzle row 1023 is shifted over a distance 2*P/3 in the Y dimension with regard to the first nozzle row 1021.

In a perfectly equivalent preferred embodiment the second nozzle row 1022 is shifted over a distance 2*P/3 and the third nozzle row 1023 over a distance P/3 in the Y dimension with regard to the first nozzle row 1021.

In yet another equivalent preferred embodiment, a row of nozzles is shifted in the Y dimension over an additional distance that corresponds with an arbitrary multiple of the pitch P. For example: the second row of nozzles 1022 could be shifted additionally over a distance of 2*P so that the total shift becomes 2*P+2*P/3, and the third row of nozzles over an additional distance of 5*P so that the total shift becomes 5P+1*P/3.

Of the essence is that shifting the nozzle rows 1021, 1022 and 1023 by a multiple of P/3 is done in a way that the resulting nozzle pitch of the printhead unit in the part where the nozzle rows of the constituting printheads overlap is P/3.

In the case that a printhead unit comprises N printheads, the nozzle rows are shifted in the Y dimension with regard to a first nozzle row over distances m*P/N that are integer multiples of P/N so that the pitch of the resulting printhead unit becomes equal to P/N.

Figure 11:
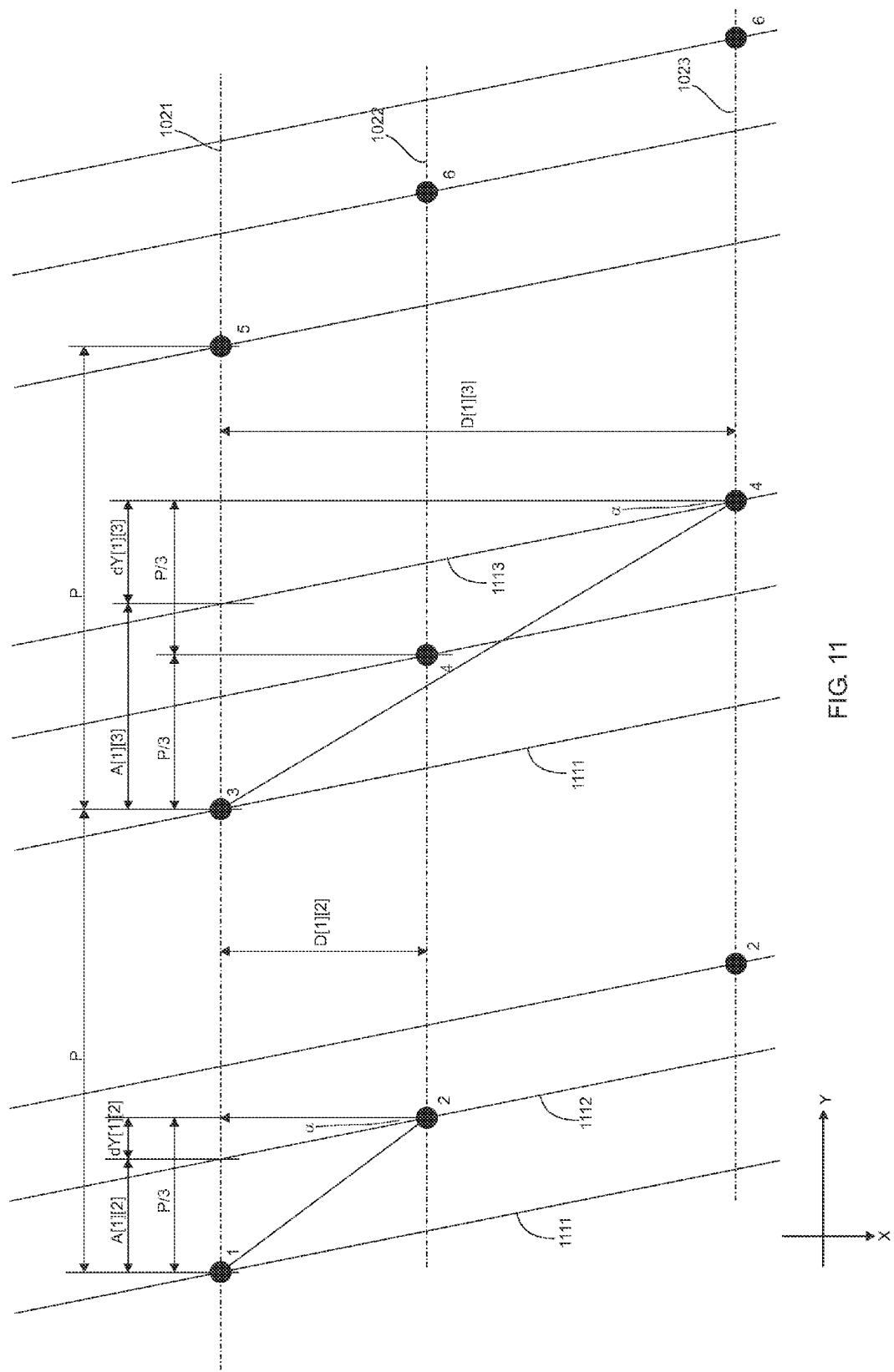
FIG. 11 describes in detail the geometrical interactions between the movements of the printhead and the cylindrical sleeve, and the distance between the spiral paths when the axis of the printhead is parallel with the axis of the cylindrical sleeve for the case that a printhead unit is used that comprises three printheads.

FIG. 11 demonstrates the effect of the distance D[1][2] on the distance A[1][2] in the Y dimension between a first spiral path 1111 on which droplets are ejected by nozzle belonging to nozzle row 1021 and a second spiral path 1112 on which droplets are ejected by a second nozzle row 1022. This distance A[1][2] is equal to:

$$A[1][2]=P/3-dY[1][2]$$

$$dY[1][2]=D[1][2]*\tan(\alpha)$$

$$A[1][2]=P/3-D[1][2]*\tan(\alpha)$$

Similarly FIG. 11 demonstrates the effect of the distance D[1][3] on the distance A[1][3] in the Y dimension between a first spiral path 1111 on which droplets are ejected by nozzles belonging to nozzle row 1021 and a third spiral path 1113 on which droplets are ejected by nozzles belonging to a third nozzle row 1023. This distance A[1][3] is equal to:

$$A[1][3]=2*P/3-dY[1][3]$$

$$dY[1][3]=D[1][3]*\tan(\alpha)$$

$$A[1][3]=2*P/3-D[1][3]*\tan(\alpha)$$

In a general prior art preferred embodiment with N printheads, a distance A[i][j] between a first spiral path on which droplets are ejected by nozzles belonging to a first nozzle row having an index number i and a second spiral path on which droplets are ejected by nozzles belonging to a nozzle row having an index number j, whereby D[i][j] refers to the distance in the X direction between the nozzle rows having index numbers i and j meets the equation:

$$A[i][j]=m*P/N-D[i]*\tan(\alpha)$$

in which m is an integer.

Figure 12:
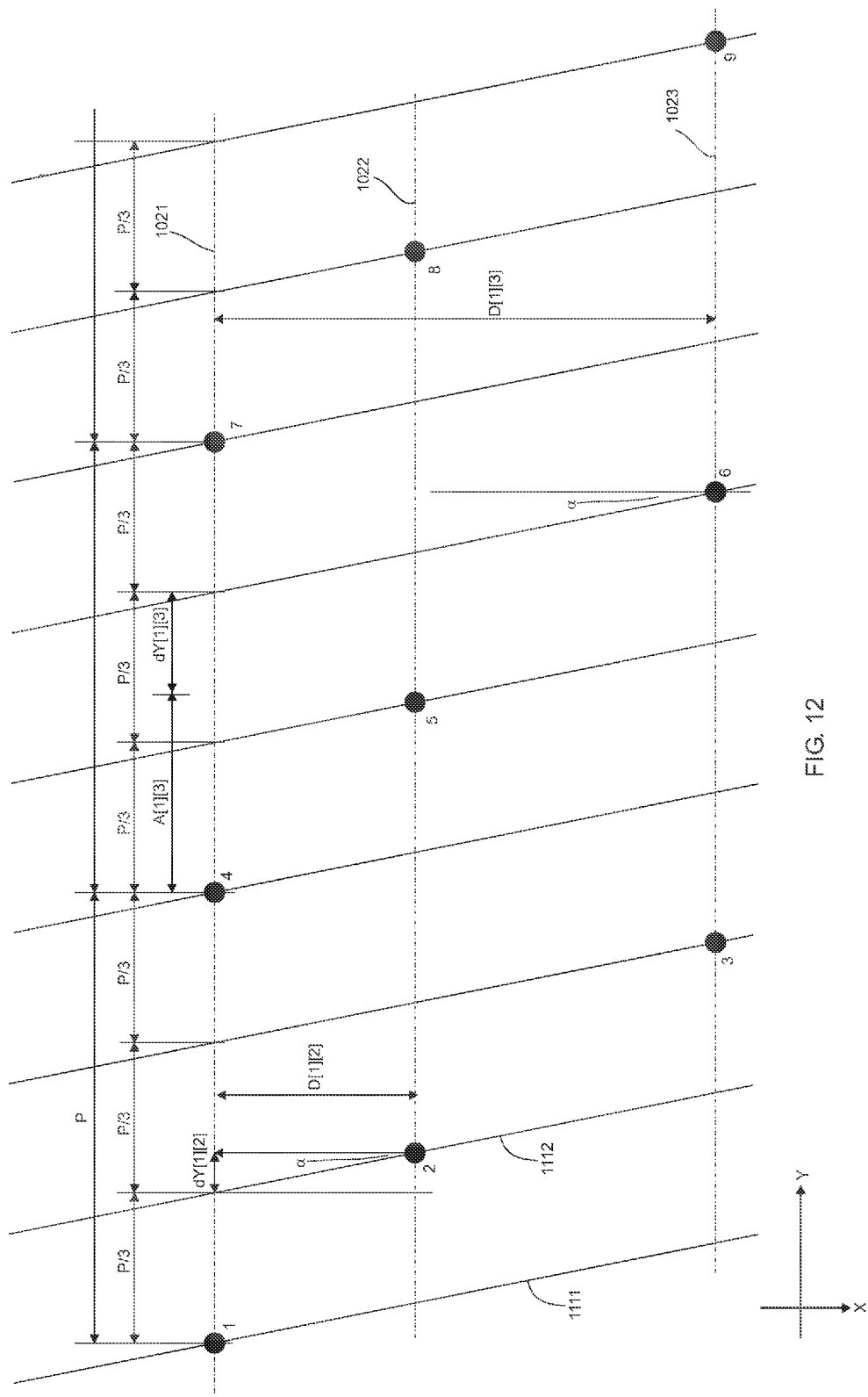
FIG. 12 describes in detail the geometrical interactions between the movements of the printhead and the cylindrical sleeve, and the distance between the spiral paths when the nozzle rows of the printhead are shifted with regard to each other for the case that a printhead unit is used that comprises three printheads.

FIG. 12 shows how a preferred embodiment of the current invention can be advantageously used for equalizing the distances between three different spiral paths.

In FIG. 12 the nozzle row 1022 is shifted over a distance P/3+D[1][2]*tan(α) in the Y dimension with regard to the nozzle row 1021. As a result, the distance between the spiral paths 1111 and 1112 is now equal to P/3.

Similarly, the nozzle row 1023 is shifted over a distance 2*P/3+D[1][3]*tan(α) in the Y dimension with regard to the nozzle row 1021. As a result, the distance between the spiral paths 1111 and 1113 is now equal 2*P/3.

The effect of the present preferred embodiment of the invention is that the distances between two neighboring spiral paths are always equal to P/3. In other words, the spiral paths are equally spaced with regard to each other in the Y dimension.

In the general case of a printhead unit that includes N printheads, according to a preferred embodiment of the invention, a second nozzle row having an index number j is shifted with regard to a first nozzle row having an index number i in the Y dimension over a distance S that meets the following equation:

$$S=m*P/N+D[i][j]*\tan(\alpha)$$

whereby D[i][j] refers to the distance between the first nozzle row having an index number i and the a second nozzle row having an index number j, and whereby m refers to an integer number.

Whereas preferred embodiments of the invention have been described in the context of an apparatus for creating a flexographic print master using a printhead that comprises fluid ejecting nozzles, it can just as well be used for other external drum based recording systems that use parallel rows of marking elements.

A first example of an alternative recording system is a laser imaging system that uses a laser head with rows of laser elements as marking elements.

A second example of an alternative recording system uses a spatial light modulator with rows of light valves as marking elements. Examples of spatial light modulators are liquid crystal devices or grating light valves.

A third example of an alternative recording system uses rows of digital mirror devices.

All these systems can be used for creating a print master. For example, a laser based marking system, a light valve marking system or a digital mirror device marking system can be used to expose an offset print master precursor.

Figure 2:
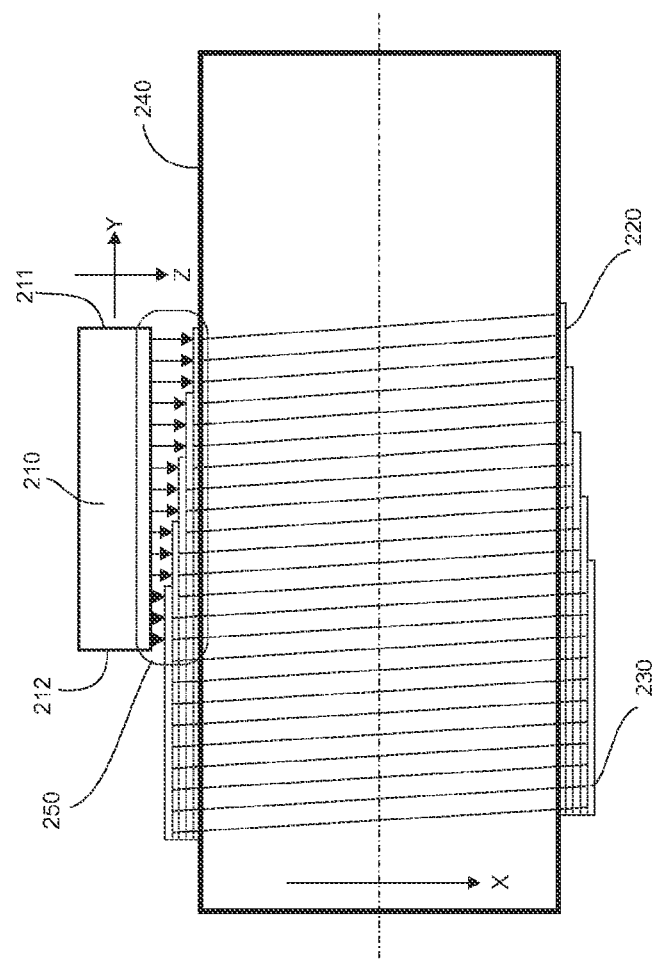
FIG. 2 shows a different view of a preferred embodiment of an apparatus for printing a relief print master on a sleeve.
Figure 1:
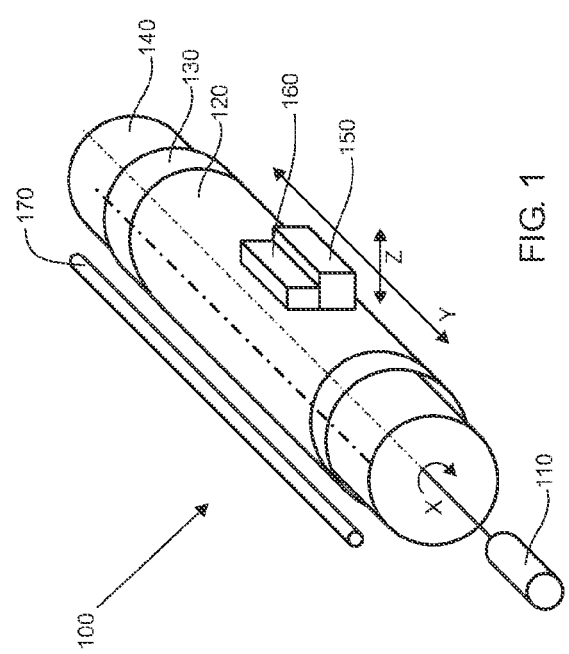
FIG. 1 shows a preferred embodiment of an apparatus for printing a relief print master on a sleeve.
Figure 4:
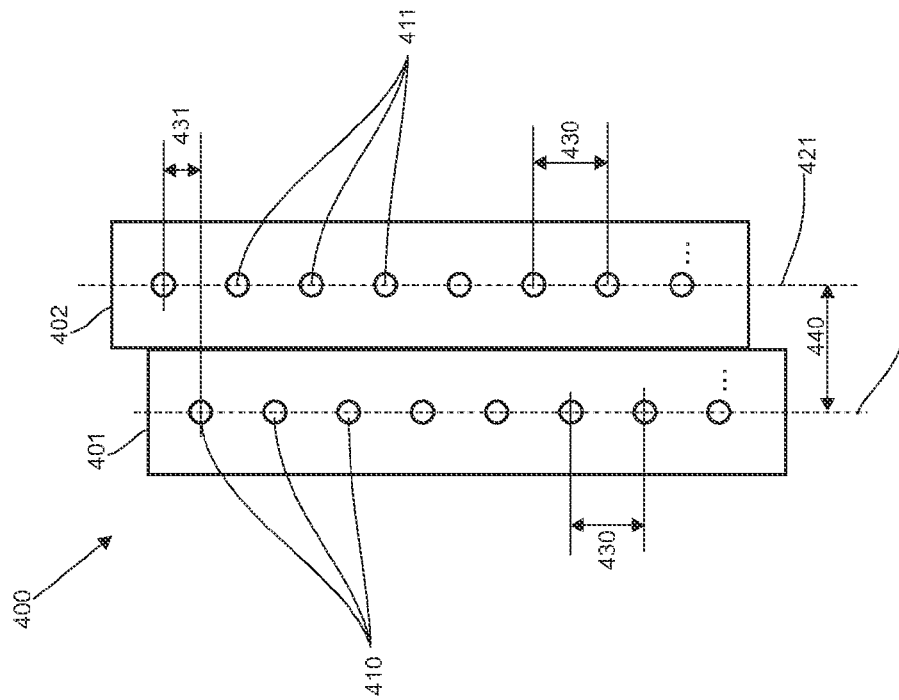
FIG. 4 shows a multiple printhead unit with two rows of nozzles.
Figure 3:
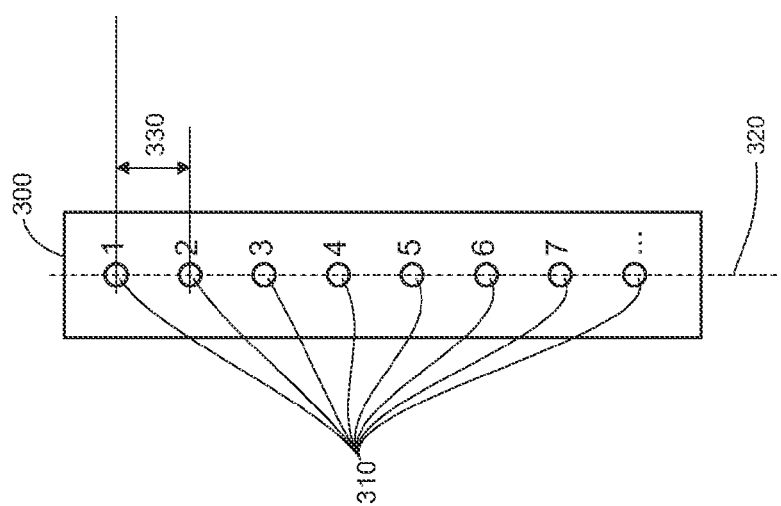
FIG. 3 shows a printhead with a single row of nozzles.

Using the preferred embodiment shown in FIGS. 1 and 2 that was earlier explained, the present preferred embodiment of the invention is advantageously used for creating a relief print master.

A relief print master can also be obtained for example by using one of the following preferred embodiments.

In a first preferred embodiment an imaging system according to the current invention is used for selectively exposing a mask layer that is on top of a flexible, photopolymerizable layer. The exposed areas of the mask layer harden out, constitute a mask and after UV flood exposure and processing define the features of the print master that are in relief. The unexposed areas are removed during processing and define the recessed portions of the relief print master.

In a second preferred embodiment, the imaging system according to a preferred embodiment of the current invention selectively exposes a flexible, elastomeric layer, whereby material is directly removed from the flexible layer upon impingement, and the recessed portions of the relief print master are formed. In this case the unexposed areas of the flexible layer define the relief features of the print master.

In a third preferred embodiment an imaging system according to a preferred embodiment of the current invention is used for selectively exposing a mask layer that is on top of a flexible, photopolymerizable layer. The exposed areas of the mask layer are partially removed as a result of ablation. As a result a mask is constituted and after UV flood exposure and processing the exposed areas are removed and define the recessed portions of the print master. The unexposed areas define the features of the print master that are in relief.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A system for preparing a print master with a marking engine, the system comprising:
   a cylindrical support including a longitudinal axis; and
   a marking head arranged to mark at least one layer of marks on the cylindrical support; wherein
   the cylindrical support rotates around the longitudinal axis relative to the marking head at a first speed, the first speed defining a first speed vector that is tangential to the cylindrical support;
   the marking head moves along a direction Y parallel to the longitudinal axis at a second speed that is linked to the first speed, the second speed defining a second speed vector;
   a sum of the first speed vector and the second speed vector defines an angle α with regard to a tangential line that is orthogonal to the longitudinal axis of the cylindrical support;
   the marking head includes N (N>1) parallel rows of marking elements that create the marks along interlaced spiral paths around the longitudinal axis;
   each row of the marking elements including a marking pitch P;
   the marking elements in different rows being interlaced to increase resolution of the marking head by a factor of N;
   a distance in a direction orthogonal to the longitudinal axis between a first row of the marking elements having an index number i and a second row of the marking elements having an index number j being a non-zero value of D[i][j], the distance D[i][j] introducing uneven spacing between the interlaced spiral paths;
   a distance measured in a direction of the longitudinal axis of the cylindrical support between marking elements in the first and second rows is equal to m*P/N+r*D[i][j]*tan(α);
   m is an integer number; and
   0.1<r<1.9, so that unevenness of the uneven spacing between the spiral paths is reduced or eliminated.

2. The system according to claim 1, wherein the marking head is an inkjet printhead, and the marking elements are inkjet nozzles.

3. The system according to claim 2, wherein the inkjet printhead ejects droplets of a curable liquid, and the system further comprises a curing source arranged to cure the curable liquid.

4. The system according to claim 1, wherein the print master is a flexographic print master.

5. The system according to claim 1, wherein the marking head is a laser head, and the marking elements are laser elements.

6. The system according to claim 1, wherein the marking head is a spatial light modulator, and the marking elements are light valves.

7. The system according to claim 1, wherein the marking head is a digital mirror device, and the marking elements are mirrors.

8. The system according to claim 1, wherein 0.5<r<1.5.

9. The system according to claim 8, wherein 0.9<r<1.1.

10. The system according to claim 9, wherein 0.99<r<1.01.

11. A method for preparing a print master with a marking engine that includes a marking head, the method comprising the steps of:
    marking with a marking head at least one layer of marks on a cylindrical support, the cylindrical support including a longitudinal axis;
    rotating the cylindrical support around the longitudinal axis relative to the marking head at a first speed, the first speed defining a first speed vector that is tangential to the cylindrical support; and
    moving the marking head at a second speed in a direction Y that is parallel to the longitudinal axis and that is linked to the first speed, the second speed defining a second speed vector; wherein
    a sum of the first speed vector and the second speed vector defines an angle α with regard to a tangential line that is orthogonal to the longitudinal axis of the cylindrical support;
    the marking head comprises N (N>1) parallel rows of marking elements that create the marks along interlaced spiral paths around the longitudinal axis;
    each row of the marking elements including a marking pitch P, the marking elements in different rows being interlaced to increase resolution of the marking head by a factor of N;
    a distance in a direction orthogonal to the longitudinal axis between a first row of the marking elements having an index number i and a second row of the marking elements having an index number j being a non-zero value D[i][j], the distance D[i][j] introducing uneven spacing between the interlaced spiral paths; and
    shifting the marking elements in two adjacent rows of marking elements in the direction of the longitudinal axis of the cylindrical support over a distance that is equal to p*P/N+r*D[i][j]*tan(α); wherein
    0.1<r<1.9; and
    p is an integer number, so that unevenness of the uneven spacing between the spiral paths is reduced or eliminated.

12. The method according to claim 11, wherein the marking head is an inkjet printhead, and the marking elements are inkjet nozzles.

13. The method according to claim 12, wherein the inkjet printhead ejects droplets of a curable liquid, and the method further comprises a step of:
    curing the curable liquid with a curing source.

14. The method according to claim 1, wherein the print master is a flexographic print master.

15. The method according to claim 11, wherein the marking head is a laser head, and the marking elements are laser elements.

16. The method according to claim 11, wherein the marking head is a spatial light modulator, and the marking elements are light valves.

17. The method according to claim 11, wherein the marking head is a digital mirror device, and the marking elements are mirrors.

18. The method according to claim 11, wherein 0.5<r<1.5.

19. The method according to claim 18, wherein 0.9<r<1.1.

20. The method according to claim 19, wherein 0.99<r<1.01.

* * * * *

UNITED STATES PATENT AND TRADEMARK OFFICE
CERTIFICATE OF CORRECTION

Page 1 of 1

PATENT NO. : 9,199,272 B2
APPLICATION NO. : 13/581691
DATED : December 1, 2015
INVENTOR(S) : Chris Gullentops It is certified that error appears in the above-identified patent and that said Letters Patent is hereby corrected as shown below:

In the claims,

The following should be corrected in Claim 14, column 10, line 47 as follows:

"The method according to claim 11, wherein the print"

Signed and Sealed this
Nineteenth Day of April, 2016

Michelle K. Lee
*Director of the United States Patent and Trademark Office*